Oct. 21, 1969 HAKURO OGUCHI ET AL 3,473,458
OPTICAL SHUTTER
Filed Jan. 27, 1967
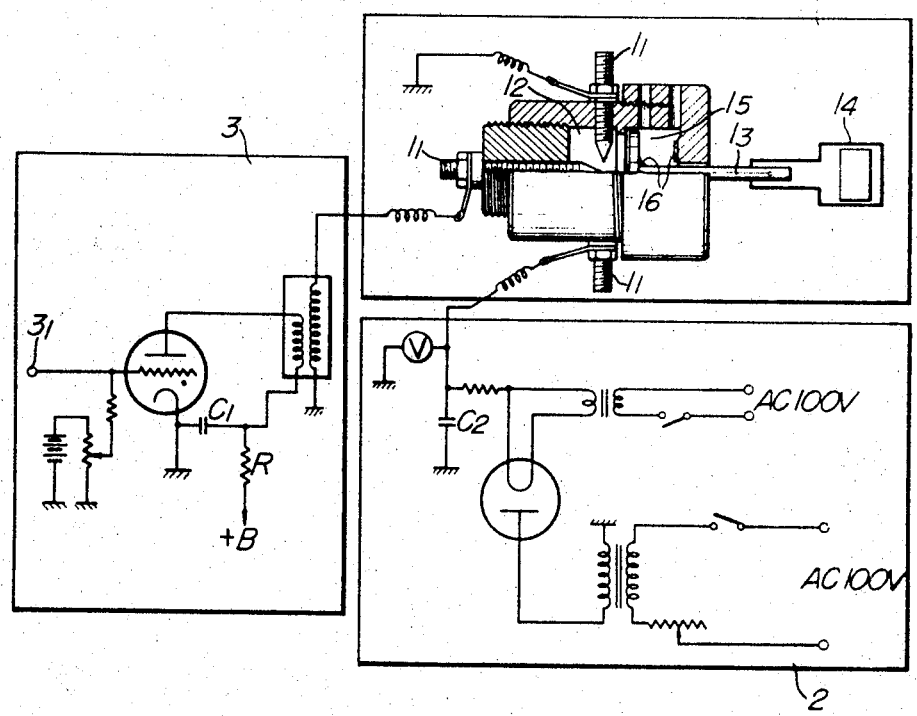
INVENTORS
HAKURO OGUCHI
KENJIRI IWASAKI
BY Paul M. Craig, Jr.
ATTORNEY United States Patent Office 3,473,458
Patented Oct. 21, 1969

3,473,458
OPTICAL SHUTTER
Hakuro Oguchi, Tokyo, and Kenjiro Iwasaki, Hachioji-shi, Japan, assignors to Hitachi, Ltd., Tokyo, Japan, a corporation of Japan
Filed Jan. 27, 1967, Ser. No. 612,270
Claims priority, application Japan, Jan. 28, 1966, 41/4,590
Int. Cl. G03b 9/36
U.S. Cl. 95—55      4 Claims

ABSTRACT OF THE DISCLOSURE

An optical shutter for high speed cameras, utilizing the energy from a spark discharge to move the shutter across the aperture. This is accomplished by using three electrodes. A high voltage is placed across two of the electrodes. The amount of voltage is determined by the physical dimensions of the electrodes and the discharge chamber, and is set at just less than the amount needed to ionize the air in the gap between the electrodes. The third electrode is attached to a signal input device and when a relatively small voltage appears on the third electrode this is sufficient to unbalance the unstable state and there is an immediate discharge which forces the piston outwardly which in term opens and closes the shutter.

BACKGROUND OF THE INVENTION

*Field of the invention*

This invention relates to shutters for cameras adapted for photographing a phenomenon changing at a high speed, and more particularly to an optical shutter which can open and close with a very short time lag after application thereto of a certain signal and which can be set to operate with predetermined values of time lag and shutter open period.

*Description of the prior art*

As is commonly known, a high speed framing camera, streak camera or the like is generally employed for photographing a phenomenon changing at a high speed. In this case, in order to photograph the motion of an object within a required time, it is often necessary that, not only the shutter open time be set at a certain predetermined value, but also the time lag between the appearance of an input signal and the photographing of the object must be limited to the shortest period of time possible. Heretofore such requirements have been dealt with by using a special camera, such as an STL camera, made to suit the above-described purpose or by mounting in a conventional high speed camera a special optical shutter, such as a Kerr cell shutter, which responds, with almost no time lag, to an input signal.

While these prior devices have sufficiently satisfactory operating characteristics in respect of the exposure time, they are very expensive and the Kerr cell shutter, for example, can only be purchased at the expense of several million yen (about sixteen thousand United States dollars). In addition to the costliness, these prior devices are not easy to handle and the Kerr cell, for example, is defective in its relatively low permeability with respect to a light beam.

SUMMARY OF THE INVENTION

The present invention contemplates to effect improvements in the prior optical shutters as described above. The primary object of the present invention is to provide an optical shutter which is easy to handle, inexpensive and which can make its optical open-close operation with a very short time lag in response to an input signal.

In the apparatus of the invention, main and grounded discharge electrode having a gap therebetween are provided in a discharge chamber. A high voltage is preliminarily applied to the main discharge electrode, spontaneous discharge of which is prevented by the resistance of the space between the main electrode and the grounded electrode. The discharge chamber is further provided with a third discharge electrode connected to an input signal generating circuit. The unstable state having been generated between the main and grounded electrodes is instantaneously broken by an input signal delivered to the third electrode from the input signal generating circuit to cause a discharge. The energy of the discharge is transferred through the discharge chamber to a movable piston mechanism which in turn transmits and interrupts a desired light beam by means of a shutter plate provided at the other end thereof.

The above-mentioned optical shutter, according to the present invention, can set the time lag of a discharge relative to an input signal at a desired value by adjusting the gap between the discharge electrodes.

More precisely, in the present invention, advantage is taken of the fact that an electric spark discharge can very quickly take place in response to an input signal and the energy of the spark discharge is utilized to mechanically drive the shutter, thereby minimizing the time lag with which the shutter can operate after appearance of the input signal. According to the present invention, the time lag could be made to a minimum value of less than 300 μsec.

BRIEF DESCRIPTION OF THE DRAWING

The sole figure is a diagrammatic explanatory view showing the structure of the optical shutter embodying the present invention.

DESCRIPTION OF THE PREFERRED EMBODIMENT

As shown in the figure, the apparatus according to the invention comprises a shutter structure 1 in which is incorporated a spark discharge means quickly responsive to an input signal. The shutter structure 1 comprises a main-spark discharge electrode $1_1$, a subspark discharge electrode $1_1'$, a grounded electrode $1_1''$, a spark chamber $1_2$ defining a spark gap between said electrodes, a piston $1_3$, a shutter plate $1_4$ connected to the front end of the piston $1_3$, a cylinder $1_5$ supporting and guiding the advancing and retracting movement of the piston $1_3$, and a stopper $1_6$ for stopping the movement of the piston $1_3$ at the end of the cylinder $1_5$.

The apparatus further includes a main-spark discharge device 2 having a structure as shown and a sub-spark discharge device 3 having therein a thyratron discharge tube and a gate terminal $3_1$.

The shutter structure as described about operates in the following manner: first, the piston $1_3$ is set at its retracted position closest to the spark chamber $1_2$ so that the front end portion of the shutter plate $1_4$ can intercept the light beam from a light source. A capacitor $C_2$ in the main-spark discharge device 2 is preliminarily charged to a predetermined voltage (1,500 to 3,000 volts in this embodiment). The sub-spark discharge device 3 is set in its operative state so that it can quickly discharge in response to the appearance of an input signal.

When an input signal appears at the gate terminal $3_1$ of the sub-spark discharge circuit 3, the discharge tube is immediately activated to generate a subsidizing spark (with about a 10 μsec. time lag in this embodiment) between the sub-discharge electrode $1_1'$ and the grounded electrode $1_1''$, and a strong spark is developed between the main-discharge electrode $1_1$ and the grounded electrode $1_1''$. (In this embodiment, a time lag of about 200

μsec. at minimum was observed.) By the energy released by this spark discharge, the piston $1_3$ is urged forward in the cylinder $1_5$ and is stopped by the stopper $1_6$ at the front end of the cylinder $1_5$. During this piston movement, the shutter plate $1_4$ moves across the predetermined light beam and thus accomplishes the close-open-close operation of the shutter.

The optical shutter of the present invention, utilizing the spark discharge as described above, can be made at very low cost, the overall cost, including the spark discharge devices, being in the order of one hundred thousand yen (about three hundred United States dollars) at the most. The optical shutter of the invention is easy to handle and is capable of passage therethrough of a light beam perfectly free from any loss by virtue of the fact that it does not include therein any optical glasses, such as polarizers, as incorporated in the Kerr cell shutter.

While a basic form of the present invention is illustrated and described, it will be readily understood that changes and modifications may be made on the above embodiment to obtain an optical shutter of more accurate and compact overall structure.

What is claimed is:

1. An optical shutter comprising a discharge chamber; first, second and third discharge electrodes provided in said discharge chamber, the gaps between said electrodes being adjustable, high voltage generating means for providing a first voltage at a level less than that necessary for causing a discharge between said first and second discharge electrodes; input signal generating means for applying to said third discharge electrode a trigger voltage to trigger said discharge between said first and second discharge electrodes; a movable piston mechanism provided in said discharge chamber, said piston mechanism being adapted to move in response to said discharge; and means mounted to said piston mechanism for opening and closing the path of a light beam synchronously with the movement of said piston mechanism.

2. An optical shutter comprising a discharge chamber; a pair of discharge electrodes disposed in said chamber; means for impressing a voltage across said electrodes, said voltage being lower than required to cause a discharge therebetween; means to cause a discharge between said electrodes by adding to the effect of said voltage in response to a small triggering signal; a piston mechanism mounted in said chamber for movement in response to said discharge; and means mounted to said piston mechanism for opening and closing the path of a light beam synchronously with the movement of said piston mechanism.

3. An optical shutter according to claim 2, wherein said voltage, although being insufficient to cause a discharge between said electrodes, is substantially sufficient to cause an unstable state therebetween.

4. An optical shutter according to claim 3, wherein the distance between said electrodes determines the time lag of said discharge relative to said triggering signal and wherein the space between said electrodes is adjustable.

References Cited

FOREIGN PATENTS 671,731  10/1963  Canada.

NORTON ANSHER, Primary Examiner

DAVID B. WEBSTER, Assistant Examiner

U.S. Cl. X.R.

95—53